Dec. 9, 1930.  C. E. GARWOOD  1,784,424
WAVE MOTOR DRIVING MECHANISM
Filed Aug. 8, 1928  3 Sheets-Sheet 1

Inventor
Charles E. Garwood
by Hazard and Miller
Attorneys

Dec. 9, 1930.  C. E. GARWOOD  1,784,424
WAVE MOTOR DRIVING MECHANISM
Filed Aug. 8, 1928  3 Sheets-Sheet 2

Inventor
Charles E. Garwood.
by Hazard and Miller
Attorneys

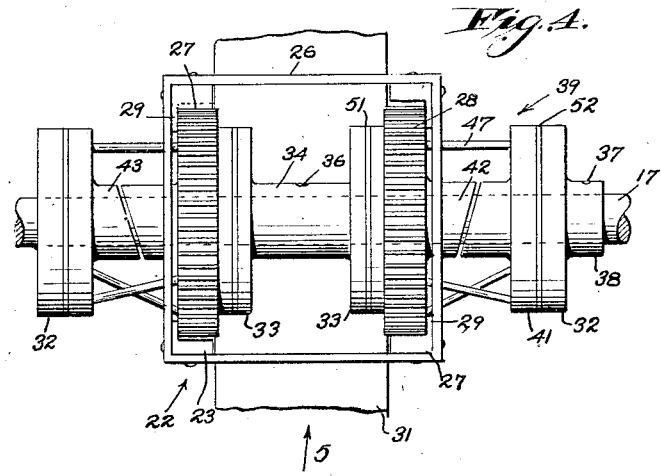
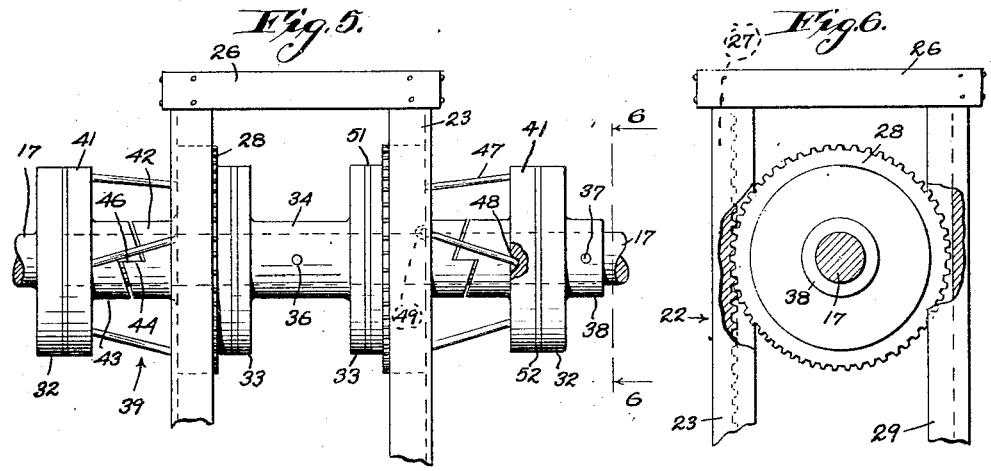
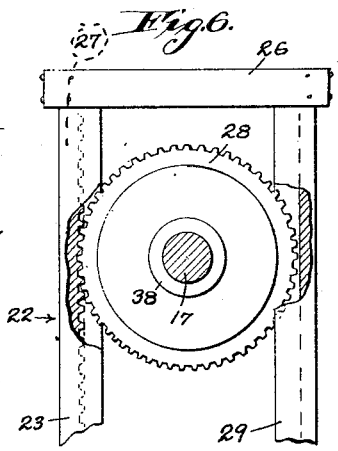
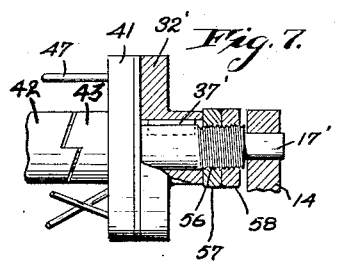

Patented Dec. 9, 1930

1,784,424

UNITED STATES PATENT OFFICE

CHARLES E. GARWOOD, OF AVALON, CALIFORNIA

WAVE-MOTOR DRIVING MECHANISM

Application filed August 8, 1928. Serial No. 298,162.

My invention relates to mechanisms adapted to translate the energy derived from wave and tide movements, into useful work.

An object of the invention is the provision of an improved mechanism, by means of which rotary movement may be imparted to a shaft by one or more members associated with the shaft and capable of moving radially and pivotally in respect to the shaft. Hence, the invention finds a particular field of utility when applied as a wave motor, since the movable members may be associated with floats resting upon the surface of more or less turbulent water, because the movement imparted by the waves to the floats will be both radial and oscillating transversely of the shaft.

Another object is the provision of a mechanism of the general class described, equipped with an energy-absorbing device by means of which a relatively steady flow of energy may be delivered, even though energy is absorbed by the device at irregular intervals as would necessarily be the case if reliance is placed upon wave action as a source of energy.

A further object is the provision of a device as described, in which the floats are capable of a relatively large range of movement so that the device is operable when installed at a point where a relatively large fluctuation of tide is encountered, as well as high waves.

A still further object of the invention is to simplify the construction as well as the means and mode of operation of tide and wave motors, whereby they will not only be cheapened in construction, but will also be rendered more efficient in use and of increased dependability of operation.

The invention possesses other objects and advantageous features, some of which, with those enumerated, will be set forth in the following description of the invention's particular embodiment which is illustrated in the drawings accompanying and forming a part of the specification.

The form of construction herein disclosed, has in actual use, proven to be very efficient, capable of facile and rapid operation, and generally desirable in other respects. For these reasons, the details herein disclosed may be considered as preferred. It should be mentioned however, that while these details will hereinafter be specifically described, variations may be effected within the scope of the invention as claimed.

Referring to the drawings:

Fig. 4 is an enlarged top plan view of a portion of the device showing the operative connection between one of the float carriages and the power shaft.

Fig. 5 is a front elevation, the direction of view being indicated by the arrow 5 of Fig. 4.

Fig. 6 is a side elevation of the portion of the wave motor shown in Figs. 4 and 5, this figure being a sectional view taken transversely of the power shaft upon a plane indicated by the line 6—6 of Fig. 5, with the direction of view indicated by the arrows.

Fig. 7 is a fragmentary detail view showing a slightly modified construction by means of which adjustment of the engagement between the float carriages and power shaft may be effected.

Figure 1:
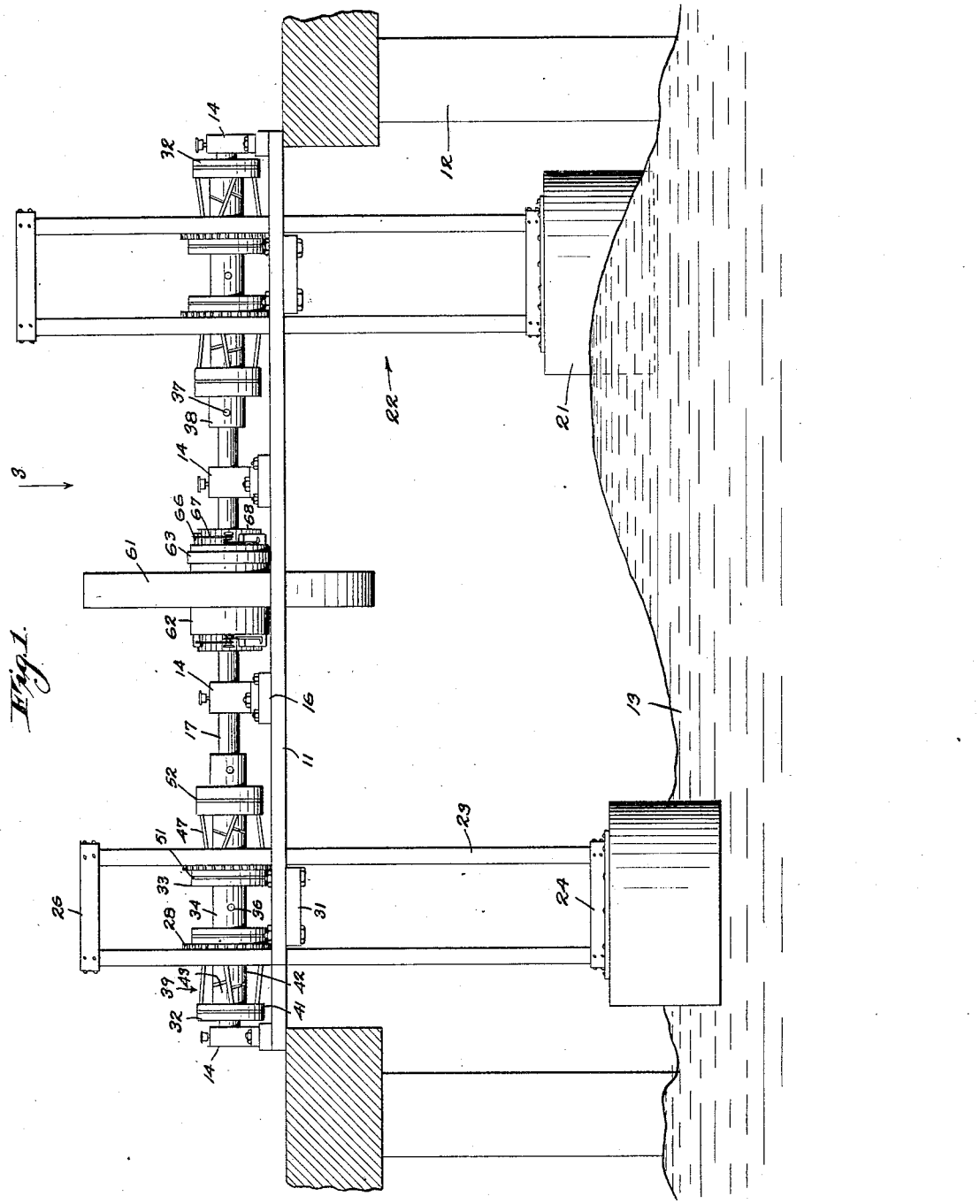
Figure 1 is a front elevation of one form of the wave motor of my invention, showing it operatively mounted in position to be activated by wave action.
Figure 2:
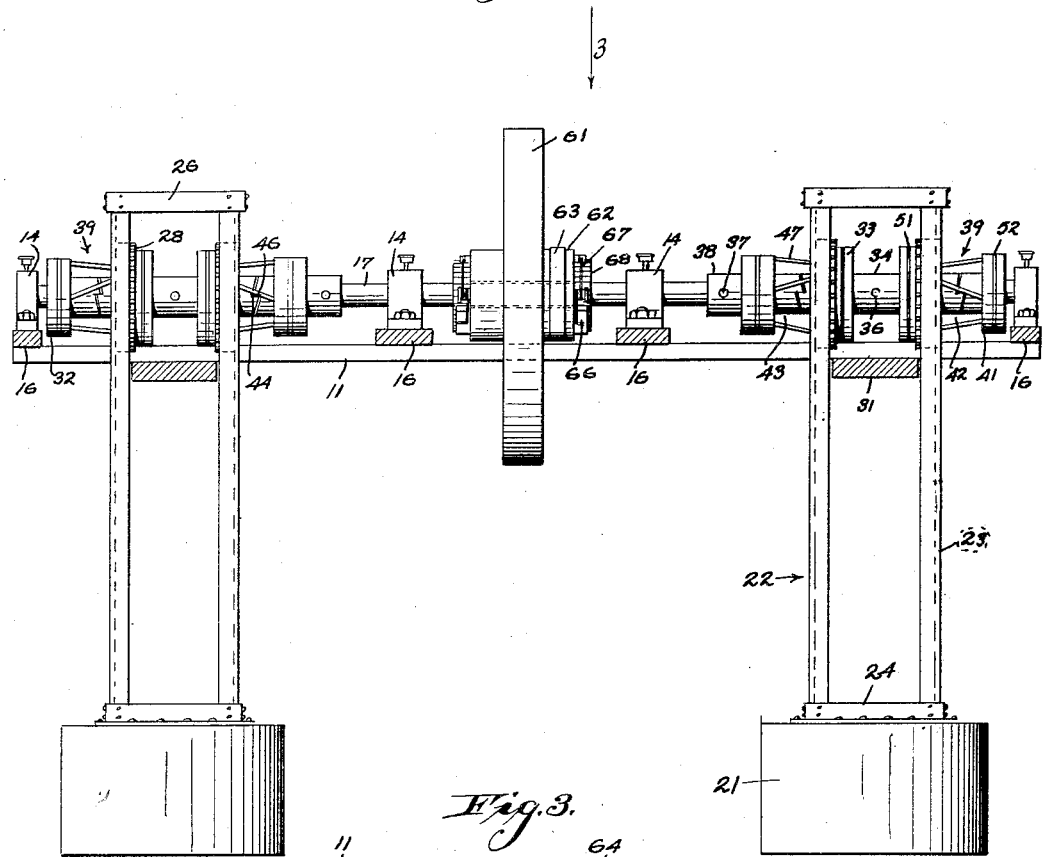
Fig. 2 is a vertical sectional view taken through a portion of the framework, to better disclose the operative parts of the invention therebehind. The plane of section is indicated by the line 2—2 of Fig. 3, and the direction of view by the arrows.
Figure 3:
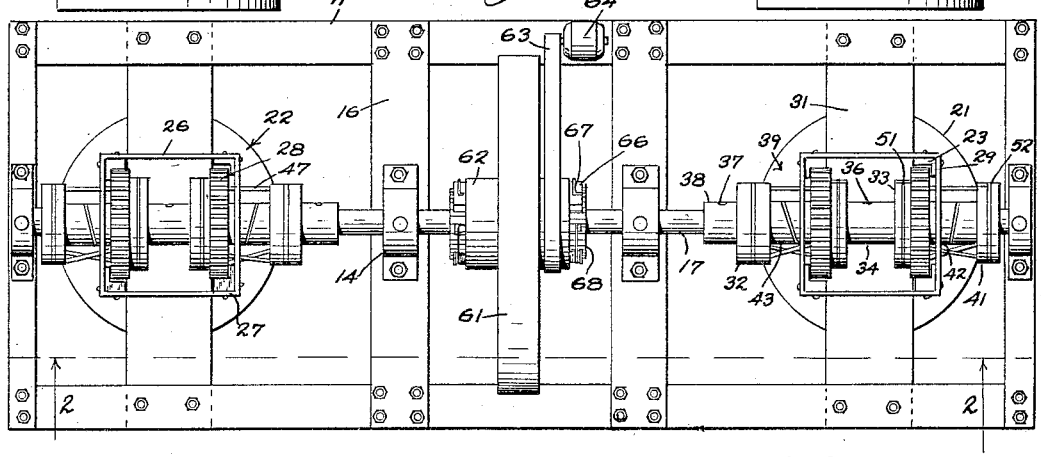
Fig. 3 is a top plan view, the direction of view being indicated by the arrow 3 of Fig. 1.

Specifically describing the invention in the most practical form of which I am at present aware, it is intended that the device shall be positioned upon a framework 11 carried by stationary piers 12 or their equivalent, and disposed above a body of water 13 which is subject to a greater or less degree of turbulence such as that resulting from wave and/or tide action.

A plurality of aligned journals 14 are mounted upon the framework 11, cross members 16 being provided for this purpose; and a suitable power shaft 17 is journalled for rotation in the journals 14. Preferably a plurality of floats 21 are operatively connected to the shaft 17 by means adapted to impart rotary movement to the shaft 17 by energy derived from the action of the waves and/or tide of the body of water 13, it being understood that the floats 21 are floating upon the surface thereof. This means includes a hanger 22 rigidly connected to each float 21, each hanger comprising preferably four corner posts 23 maintained in spaced parallel arrangement by transverse rails 24 at their lower ends, and 26 at their upper ends. The four posts 23 are arranged in pairs, the posts of each pair being disposed upon opposite sides of the shaft 17.

Each pair of rails 24 is provided with a rack 27 extending throughout the length thereof, these racks being disposed at diametrically opposite points, i. e., the racks are upon opposite sides of the shaft 17.

A pair of pinions 28 are associated with each hangar 22 and journalled upon the shaft 17. These pinions 28 are spaced upon the shaft 17 so that each is enmeshed with one of the racks 27. Accordingly, when the float 21, and with it the hanger 22, moves upwards, one of the pinions 28 is rotated in one direction about the axis of the shaft, and the other pinion 28 is rotated in the opposite direction; and when the float 21 is lowered, the respective directions of rotation of these pinions are reversed. Disengagement of the pinions 28 from their respective racks 27, is prevented by the opposite corner post 23, which is in sliding engagement with the tops of the teeth of the pinion 28 on the opposite side of the shaft 17, as clearly shown on Fig. 6.

Means for preventing lateral displacement of the hangers 22 in respect to the associated pinions 28, is provided in the form of flanges 29 in engagement with the sides of the pinions 28. Additional means are provided in the form of a cross member 31 rigid with the frame 11 and between the pairs of corner posts 23 of each hanger 22.

Thus it may be seen that multi-directional movement of the floats 21 and hangers 22 is permitted, the movement of each float and hanger being restricted to a single plane to which the shaft 17 is perpendicular.

Clutch means are provided for locking the shaft 17 to the pinions 28, to be rotated thereby in one direction, and automatically freeing the pinions 28 from the shaft 17 when they are rotated in the opposite direction.

Two collars 32 and 33 are rigidly mounted upon the shaft 17 upon opposite sides of each pinion 28. The collars 33 associated with the two pinions 28 of each set, may conveniently be formed integral and joined by a sleeve 34 rigidly connected to the shaft 17 by a pin or rivet 36, whereas the collars 32 are joined to the shaft 17 by a pin or rivet 37 extending through a sleeve 38 rigid with each of the collars 32. The fixed collars 32 and 33 associated with each pinion 28, are spaced sufficiently to accommodate the clutch member indicated in its entirety at 39.

Between each pinion 28 and its associated outer fixed collar 32, a loose collar 41 is journalled upon the shaft 17. Preferably the loose collar 41 and pinion 28 are splined or otherwise coupled to permit relative sliding motion thereof, but restricted against relative rotation. This restriction however, is such that a limited amount of rotational play between the two members is permitted. This may be effected by providing the pinion 28 with a sleeve 42, and the loose collar 41 with a sleeve 43, and forming shoulders 44 and 46 upon the sleeves 42 and 43 respectively, these shoulders being in sliding engagement as clearly shown upon Fig. 5.

A plurality of pins 47, say three, are interposed between each pinion 28 and associated loose collar 41. Each of these pins is loosely seated at one end in a socket 48 in the inner face of the loose collar 41, and the other end of each pin 47 is similarly seated in a socket 49 in the outer face of the pinion 28. The sockets 48 and 49 are similarly spaced about their respective faces; and the pins 47 are slightly longer than the maximum distance between the bottoms of the sockets 48 and 49 associated with each pin, with the result that the pins 47 are helically disposed about the shaft 17. They are arranged so that they incline from the outer face of the pinion 28 in the direction of forward rotation of the shaft 17.

Annular friction linings 51 and 52 respectively, may be interposed between the pinion 28 and its associated fixed collar 33, and between the loose collar 41 and its associated fixed collar 32.

From the above recited structure of the clutch members 39, it is readily apparent that when any one of the pinions 28 is rotated in a forward direction, the frictional resistance against similar rotation of the associated loose collar 41, results in a slight lag in rotation of the latter. Consequently, the pins 47 interposed between the pinion 28 and loose collar 41, tend to swing to positions more nearly in parallelism with the axis of the shaft 17, resulting in increasing their effective length and separating the pinion 28 and loose collar 41. This action results in pressing the pinion 28 toward the associated rigid collar 33, and the loose collar 41 toward the rigid collar 32, whereupon the rigid collars 32 and 33 will be frictionally engaged to effect forward rotation of the shaft 17 to which they are affixed. Since one of the pinions 28 associated with each hanger 22 is rotated in a forward direction when the hanger moves upwards, and the other pinion 28 is rotated in a forward direction when the hanger moves downwards, it is readily apparent that power will be applied to the shaft 17 throughout either vertical movement of the float 21.

It may also be readily understood that rotation of the shaft 17 will be effected when the float 21 swings in an arcuate path about the axis of the shaft 17 in one direction, and that when the float 21 swings in the reverse direction, the pins 47 of each associated clutch member 39, will be swung to positions more remote from parallelism with the axis of the shaft 17, permitting disengagement of the clutches and idling of the pinions 28 as the hanger 22 returns to vertical position. It is to be understood of course, that disengagement of the clutch member 39 opposite that by means of which power is being applied to the shaft 17 during either vertical movement of the float 21, is similarly released to permit idling; and also, that the downward vertical movement of the float 21 results from the action of the force of gravity thereon after the wave or tide which has lifted it, has receded.

Since the spacing between the fixed collars 32 and 33 is a matter of considerable importance, I have found that it offers convenience to construct the device according to the modification disclosed upon Fig. 7. Here, instead of being rigidly affixed to the shaft 17', the outer fixed collar 32' is slidably mounted upon the shaft 17' and locked against relative rotation thereupon by a feather 37'. The shaft 17' is provided with threads 56 adjacent the outer end of each of the collars 32' upon which a nut 57 is engaged. Thus, by altering the position of the nut 57 upon the threads 56, the effective distance between the inner collar 33 and outer collar 32' may be adjusted. A lock nut 58 is also provided upon the threads 56 to retain the parts in adjusted position.

In order that the necessarily more or less irregular power applied to the shaft 17 may be taken from the mechanism in a more nearly constant form, a fly-wheel 61 is journalled upon the shaft 17. This fly-wheel is provided with relatively large hubs 62 to increase the bearing surface thereof with the shaft 17, and to provide a convenient pulley by means of which a belt 63 may take power from the fly-wheel and apply it to any convenient mechanism such as a generator 64. The fly-wheel 61 is adapted to be driven in a forward direction by a plurality of dogs 66, each of which is pivoted upon a pin extending from an outer face of the hub 62 parallel to the axis of the shaft 17. Each dog 66 is pressed by a spring 67 against a ratchet 68, one of these ratchets 68 being provided adjacent each face of the hub 62 rigid with the shaft 17, it being understood that the teeth of the ratchets 68 are so arranged that rotation of the fly-wheel 61 in a forward direction in respect to the shaft 17, is permitted; but that rotation of the fly-wheel in a reverse direction in respect to the shaft 17 is prevented by engagement of the dogs 66 with the ratchets 68.

Since the operation of the various portions of the device has been discussed in connection with the disclosure of their constituent parts, a description of the operation of the complete device is hardly deemed necessary. Suffice it to say therefore, that when any of the floats 21, of which there may be any desired number, is moved upwards by the force of a wave or otherwise, one of the pinions 28 will cause its associated clutch member 39 to expand and lock the pinion 28 to the shaft 17 to drive the shaft in a forward direction therewith. At the same time, the other clutch member 39 will be released, permitting its associated pinion 28 to idle. When the upward movement of the float 21 has been completed, and the float starts to fall of its own weight, the first clutch member 39 will be released, and the other will now be engaged so that power is similarly applied to the shaft 17 for both up and down strokes of the float 21.

Furthermore, if the action of the waves tends to swing the front back and forward about the axis of the shaft 17, the clutch members 39 will tighten when the float 21 swings in the direction of forward rotation of the shaft 17 so as to apply power to the shaft 17 throughout such swinging; but when the float 21 swings in the reverse direction, the clutch members 39 will be contracted, permitting the pinions 28 to idle. In addition to this, these two actions may occur simultaneously, there being no restriction to the movement of the floats 21, except that of retaining each of them in a single plane to which the shaft 17 is perpendicular.

The engagement of the dogs 66 with the ratchets 68 will effect forward rotation of the fly-wheel 61 when the shaft 17 is rotated in a forward direction; but the mass of the fly-wheel 61 should be such that it will continue rotating in a forward direction, even when the rotation of the shaft 17 becomes slower than that of the fly-wheel 61, so that a more nearly even flow of power may be supplied by the belt 63 or its equivalent.

I claim:

1. In a wave motor comprising, a revolubly mounted shaft, a member connected to the shaft for multi-directional movement in a plane to which said shaft is perpendicular, a pinion journalled upon the shaft, and a rack carried by said member in mesh with said pinion; a one-way engaging clutch actuated by said pinion and imparting rotational movement to said shaft, and comprising spaced collars rigid with said shaft upon opposite sides of the pinion, a collar journalled and slidably mounted upon said shaft between the pinion and one of said rigid collars, and a plurality of pins, each having one end loosely seated in a socket in said pinion and the other end in a socket in the journalled collar, said pins being helically disposed and sloping from said pinion in the direction of turning of said shaft, said pins being longer than the distances between the bottoms of their respective sockets when the associated collar and pinion are in engagement with their respective rigid collars.

2. In a wave motor comprising, a revolubly mounted shaft, a member connected to the shaft for multi-directional movement in a plane to which said shaft is perpendicular, a pinion journalled upon the shaft, and a rack carried by said member in mesh with said pinion; a one-way engaging clutch actuated by said pinion and imparting rotational movement to said shaft, and comprising spaced collars rigid with said shaft upon opposite sides of the pinion, a collar journalled and slidably mounted upon said shaft between the pinion and one of said rigid collars, and a plurality of pins, each having one end loosely seated in a socket in said pinion and the other end in a socket in the journalled collar, said pins being helically disposed and sloping from said pinion in the direction of turning of said shaft, said pins being longer than the distances between the bottoms of their respective sockets when the associated collar and pinion are in engagement with their respective rigid collars, said pinion and journalled collar being slidably coupled for rotation together.

3. A mechanical movement comprising a shaft, a driving member journalled thereon, means holding said member against longitudinal movement on said shaft, a driven member secured to said shaft and spaced from said driving member, a collar journalled and slidable on said shaft between said members and adapted to engage one thereof, and a plurality of helically arranged pins interposed between said collar and the driving member.

4. A mechanical movement comprising a shaft, a driving member journalled thereon, means holding said member against longitudinal movement on said shaft, a driven member secured to said shaft and spaced from said driving member, a collar journalled and slidable on said shaft between said members and adapted to engage said driven member, and a plurality of helically arranged pins interposed between said collar and the driving member, said pins sloping from the driving member in the direction of rotation thereof.

5. A mechanical movement comprising a shaft, a driving member journalled thereon, means holding said member against longitudinal movement on said shaft, a driven member secured to said shaft and spaced from said driving member, a collar journalled and slidable on said shaft between said members and adapted to engage said driven member, and a plurality of pins, each having one end seated loosely in a socket in said driving member and the other end in a socket in said collar, said pins being helically disposed and sloping from the driving member in the direction of rotation thereof, said pins being longer than the maximum distance between the bottoms of their respective sockets measured parallel to said shaft.

In testimony whereof I have signed my name to this specification.

CHARLES E. GARWOOD.